US011651364B2

(12) United States Patent
Ajayi

(10) Patent No.: US 11,651,364 B2
(45) Date of Patent: May 16, 2023

(54) SYSTEM AND METHOD FOR TRANSLATING A MESSAGE BETWEEN A SYSTEM AGNOSTIC FORMAT AND ONE OF A PLURALITY OF PREDETERMINED SYSTEM FORMATS

(71) Applicant: MASTERCARD INTERNATIONAL INCORPORATED, Purchase, NY (US)

(72) Inventor: Raphael Ajayi, Lagos (NG)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 38 days.

(21) Appl. No.: 16/755,335

(22) PCT Filed: Sep. 28, 2018

(86) PCT No.: PCT/US2018/053308
§ 371 (c)(1),
(2) Date: Apr. 10, 2020

(87) PCT Pub. No.: WO2019/074689
PCT Pub. Date: Apr. 18, 2019

(65) Prior Publication Data
US 2021/0201303 A1 Jul. 1, 2021

(30) Foreign Application Priority Data
Oct. 12, 2017 (SG) .............. 10201708447S

(51) Int. Cl.
*G06Q 20/38* (2012.01)
*G06Q 20/02* (2012.01)
*G06Q 20/40* (2012.01)

(52) U.S. Cl.
CPC ......... *G06Q 20/386* (2020.05); *G06Q 20/027* (2013.01); *G06Q 20/401* (2013.01)

(58) Field of Classification Search
CPC .. G06Q 20/386; G06Q 20/027; G06Q 20/401; H04L 51/36
See application file for complete search history.

(56) References Cited

U.S. PATENT DOCUMENTS 9,275,380 B1 * 3/2016 Symonds ............. G06Q 20/208
10,614,454 B1 * 4/2020 Brooks, V ............ H04L 63/105
(Continued)

FOREIGN PATENT DOCUMENTS

AU 2015201705 A1 * 4/2015

OTHER PUBLICATIONS

"Susan Herbst-Murphy, Clearing and Settlement of Interbank Card Transactions: A Mastercard Tutorial for Federal Reserve Payments Analysts, Oct. 2013, Federal Reserve Bank of Philadelphia, Discussion Paper Payment Cards Center, p. 1-22" (Year: 2013).*
(Continued)

*Primary Examiner* — Courtney P Jones
(74) *Attorney, Agent, or Firm* — Talem IP Law, LLP

(57) ABSTRACT

The present application provides systems and methods for translating a message between a system agnostic format and one of a plurality of predetermined system formats. The methods comprise steps of receiving a message, from a first party, in a system agnostic format that comprises transactional properties of a transaction conducted at a financial service terminal, the transactional properties of the transaction at least comprising a channel of the transaction; and translating the message into one of a plurality of predetermined system formats in response to the channel of transaction.

17 Claims, 5 Drawing Sheets

(56) References Cited

U.S. PATENT DOCUMENTS

| | | |
|---|---|---|
| 2007/0005774 A1 | 1/2007 | Singh et al. |
| 2012/0011067 A1 | 1/2012 | Katzin et al. |
| 2012/0278205 A1* | 11/2012 | Chin .................... G06Q 10/087 |
| | | 705/28 |
| 2013/0159184 A1* | 6/2013 | Thaw ................... G06Q 20/342 |
| | | 705/44 |
| 2013/0254110 A1* | 9/2013 | Royyuru ................ G06Q 20/36 |
| | | 705/44 |
| 2016/0026987 A1* | 1/2016 | Modi ................... G06Q 20/203 |
| | | 705/21 |
| 2016/0034900 A1* | 2/2016 | Nelsen ............... G06Q 20/3224 |
| | | 705/44 |
| 2016/0217466 A1* | 7/2016 | Kennedy ............. G06Q 20/023 |
| 2016/0267466 A1* | 9/2016 | Kumnick ............. G06Q 20/326 |
| 2018/0005209 A1* | 1/2018 | Ranganathan ......... G06Q 20/12 |

OTHER PUBLICATIONS

"International Search Report and Written Opinion Issued in International Application No. PCT/US2018/053308", dated Jan. 8, 2019, 10 pages.

* cited by examiner

SYSTEM AND METHOD FOR TRANSLATING A MESSAGE BETWEEN A SYSTEM AGNOSTIC FORMAT AND ONE OF A PLURALITY OF PREDETERMINED SYSTEM FORMATS

CROSS-REFERENCE TO RELATED APPLICATIONS

This application is the U.S. National Stage Application of International Application No. PCT/US2018/053308, filed Sep. 28, 2018, which claims the benefit of, and priority to, Singapore Patent Application No. 102017084475 filed on Oct. 12, 2017. The entire disclosures of the above applications are incorporated herein by reference.

FIELD OF INVENTION

The following discloses systems and methods for translating a message between a system agnostic format and one of a plurality of predetermined system formats.

BACKGROUND

There are two kinds of networks on which payment card transactions are conducted. The first is a single-message system designed for automated teller machines (ATMs) and point-of-sale (POS) transactions that mainly requires personal identification number (PIN) entry by a cardholder to authenticate transactions. The second is a dual-message system designed for credit card and debit card transactions that generally relies on the cardholder's signature to authenticate transactions.

Different system messaging formats are used in these two networks. In a single-message transaction, an acquirer submits a single electronic message to a payment gateway. The single electronic message contains all data required for authorization, clearing and settlement of the transaction. Actual financial settlement occurs at a later time. In a dual-message transaction, the acquirer submits two electronic messages to the payment gateway at the time of purchase: the first electronic message contains information required for an authorization decision, whereas and a second message at a later point in time containing additional data required for clearing and settlement.

Participants (e.g. merchants or banks) who would like to allow or manage both types of transactions will need to set up both the dual-message system and the single-message system at their end. Various data elements used in both systems require user's in-depth knowledge for determining what type of message is being processed. Various reconfigurations of the existing user systems will be required in an attempt to process both type of transactions.

There are hurdles for setting up both dual-message and single-message systems at the participant's end. First of all, additional costs will be incurred for implementing both dual-message and single-message formats at the participants' end, since technical supports will be required at the participants' end due to challenges in network configuration or system integration. Secondly, the technical knowledge required for operating the dual-message and single-message systems will be a burden to the participants. An accidental improper operation may hamper proper processing and affect the customer's business. Thirdly, additional equipment (such as routers, switches or interface processors) will be needed to implement dual-message and single-message systems. Any delay in delivering the additional equipment will cause inconvenience in operation and hinder the customer from making revenue.

There is thus a need for a technical solution to provide simplified systems and methods that enable the participants to allow or manage both types of transactions without the hurdles for setting up both dual-message and single-message systems at the participant's end and thereby improve interoperability of systems, simplify network architecture and reduce the number of infrastructure components. Furthermore, other desirable features and characteristics will become apparent from the subsequent detailed description and the appended claims, taken in conjunction with the accompanying drawings and this background of the disclosure.

SUMMARY

According to a first aspect of the present invention, there is provided a method of translating a message between a system agnostic format and one of a plurality of predetermined system formats, the method comprising: receiving a message, from a first party, in a system agnostic format that comprises transactional properties of a transaction conducted at a financial service terminal, the transactional properties of the transaction at least comprising a channel of the transaction; and translating the message into one of a plurality of predetermined system formats in response to the channel of transaction.

In various examples of the first aspect, the channel indicates where a transaction takes place, which serves as an essential nature that determines a type of the transaction. Different channels may refer to different types of transaction. For example, the channel of the transaction can be, for example, an ATM machine, a POS machine, a core banking service terminal used at a bank counter, a virtual check-out server and/or the like. If the channel indicates that the transaction is conducted at an ATM machine, the transaction can be determined as a single-message system transaction. Likewise, if the channel indicates that the transaction is conducted at a POS machine of a brick and mortar store or a virtual check-out server of an e-Commerce store, the transaction can be determined as a dual-message system transaction.

According to a second aspect of the present invention, there is provided a format translator for translating a message between a system agnostic format and one of a plurality of predetermined system formats, the format translator comprising: an input module configured to receive a message, from a first party, in a system agnostic format that comprises transactional properties of a transaction conduced at a financial service terminal, the transactional properties of the transaction at least comprising a channel of the transaction; a translation module configured to translate the message into one of a plurality of predetermined system formats in response to the channel of the transaction; and an output module configured to communicate the translated message.

According to a third aspect of the present invention, there is provided a non-transitory computer readable medium having stored thereon executable instructions for controlling a format translator to perform steps comprising: receiving a message, from a first party, in a system agnostic format that comprises transactional properties of a transaction conducted at a financial service terminal, the transactional properties of the transaction at least comprising a channel of the transaction; and translating the message into one of a plurality of predetermined system formats in response to the channel of transaction.

In respective examples of the second and the third aspects, the channel of the transaction carries the same meaning as described above with respect to the first aspect.

BRIEF DESCRIPTION OF THE DRAWINGS

Embodiments of the invention will be better understood and readily apparent to one of ordinary skilled in the art from the following written description, by way of example only, and in conjunction with the drawings, in which.

The transaction can also be a currency conversion transaction taken place at a bank counter, a cash withdrawal transaction taken place at an automated teller machine (ATM), etc, as described in detail below. In such scenarios, the participant can be a financial institute, e.g. an acquirer bank that own and run the bank counter or the ATM machine, etc.

Figure 1:
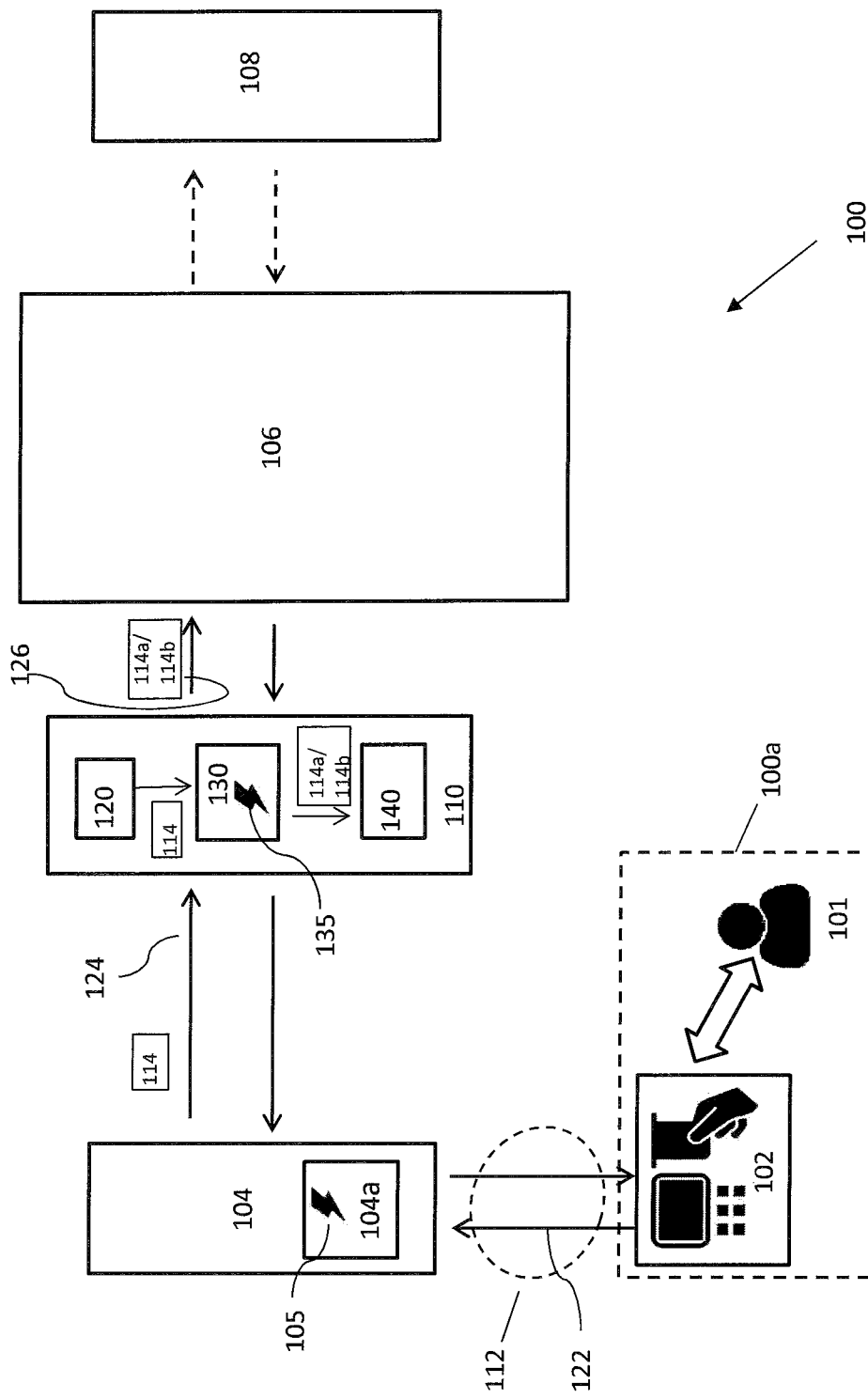
FIG. 1 shows a schematic of a system, in accordance with a first embodiment of the present application, wherein a format translator is used for translating a message between a system agnostic format and one of a plurality of predetermined system formats. In the first embodiment, the format translator is implemented as a stand-alone device between a participant of a transaction and a payment gateway that facilitates the authorization, clearing and settlement of the transaction. A person skilled in the art will appreciate that the participant can be an acquirer bank of a merchant that participates in payment of a good or service purchase transaction taken place at either a brick and mortar store or an e-Commerce store of the merchant.
Figure 2:
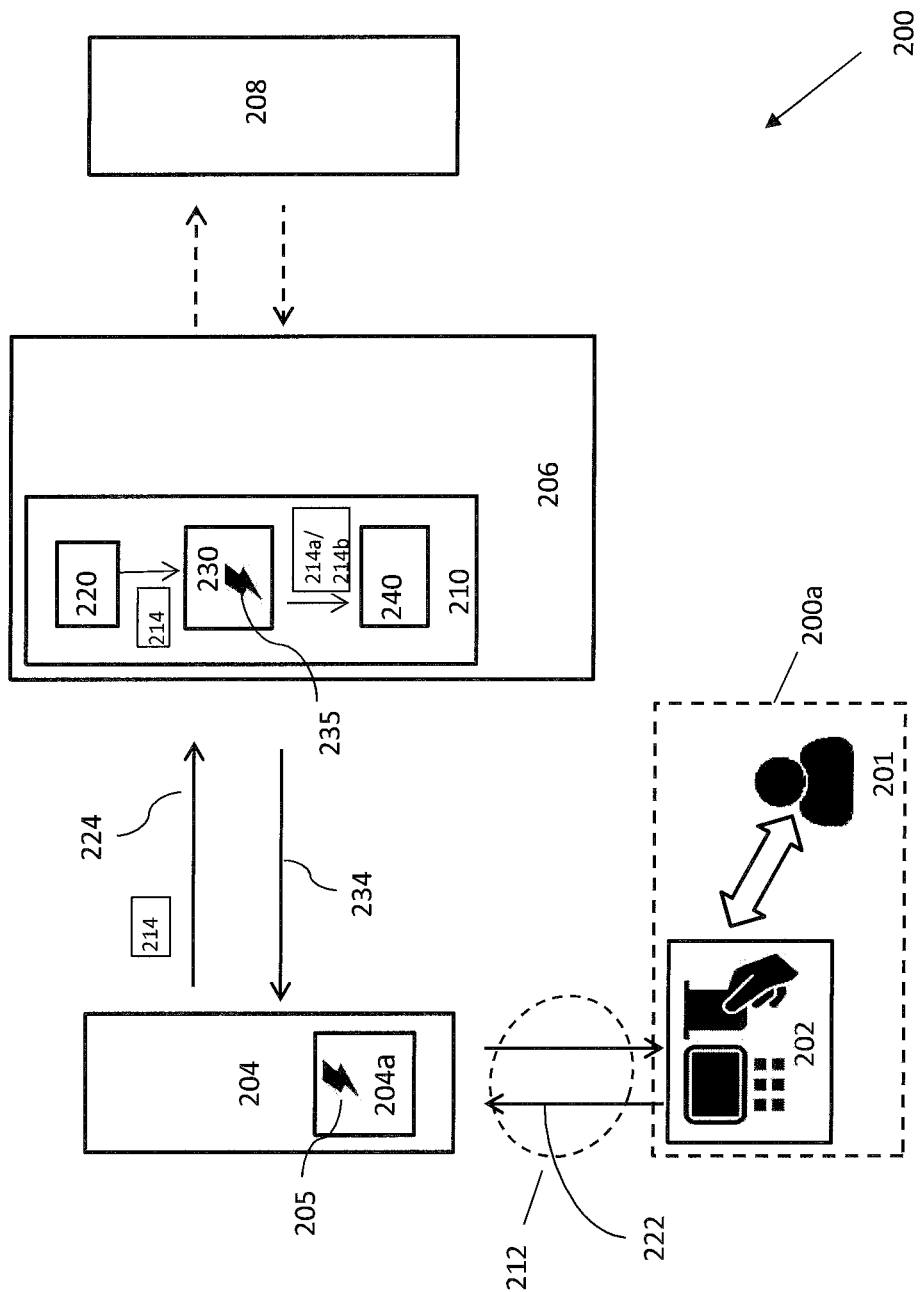

FIG. 2 shows another schematic of the system, in accordance with a second embodiment of the present application, wherein the format translator as shown in FIG. 1 is implemented in the payment gateway. In the second embodiment, the format translator can be in the form of either a part of a firmware, a software patch, or a part of hardware for a processor of the payment gateway.

Figure 3:
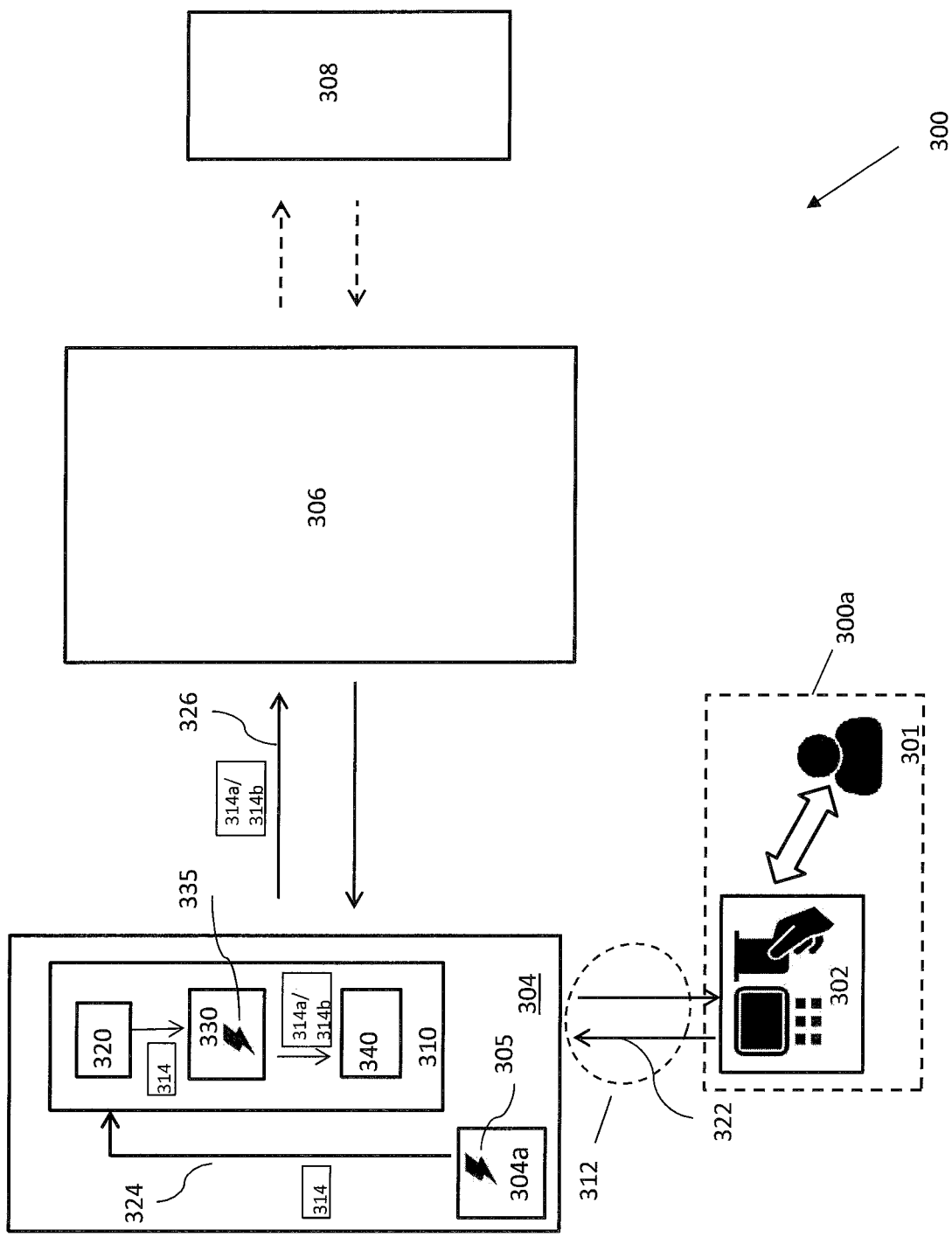

FIG. 3 illustrates a further schematic of the system, in accordance with a third embodiment of the present application, wherein the format translator as shown in FIGS. 1 and 2 is implemented in an acquirer bank that participates in the authorization, clearing and settlement of a transaction as described in the first embodiment.

Figure 4:
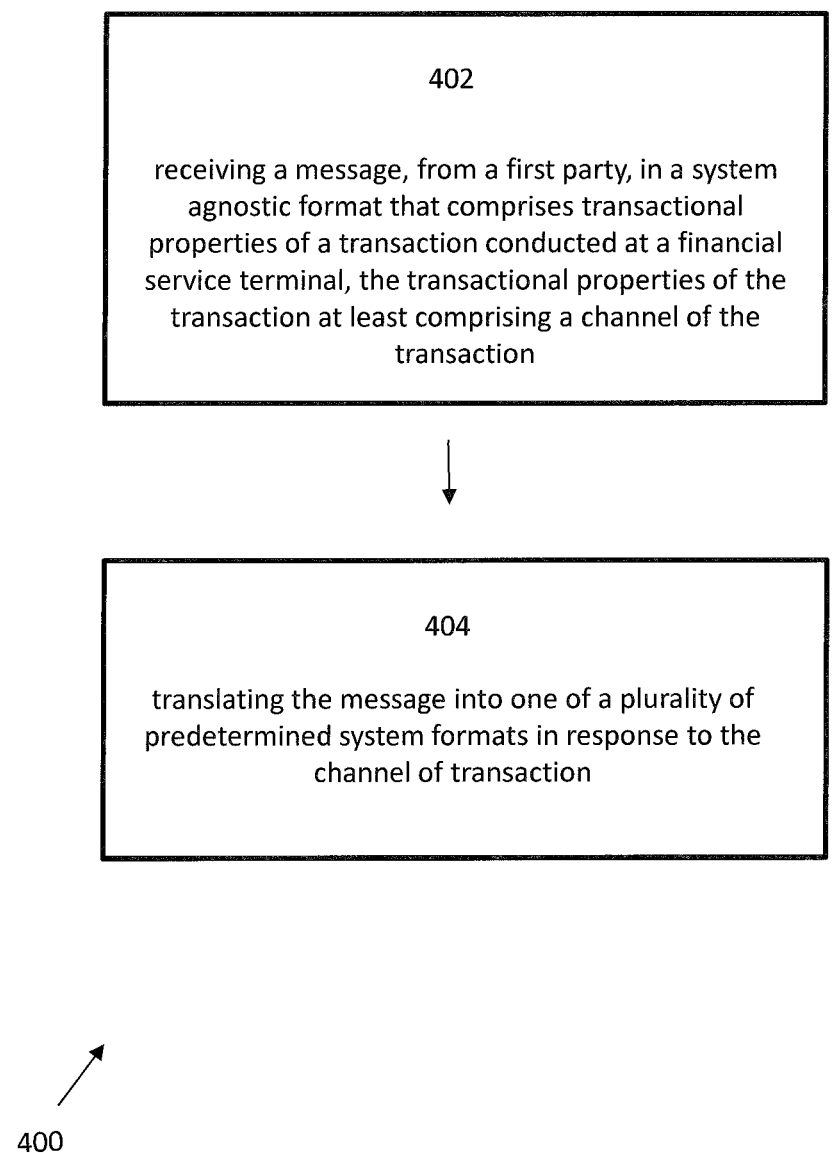

FIG. 4 shows a flowchart depicting steps of a method for translating a message between a system agnostic format and one of a plurality of predetermined system formats, in accordance with the embodiments shown in FIGS. 1 to 3.

Figure 5:
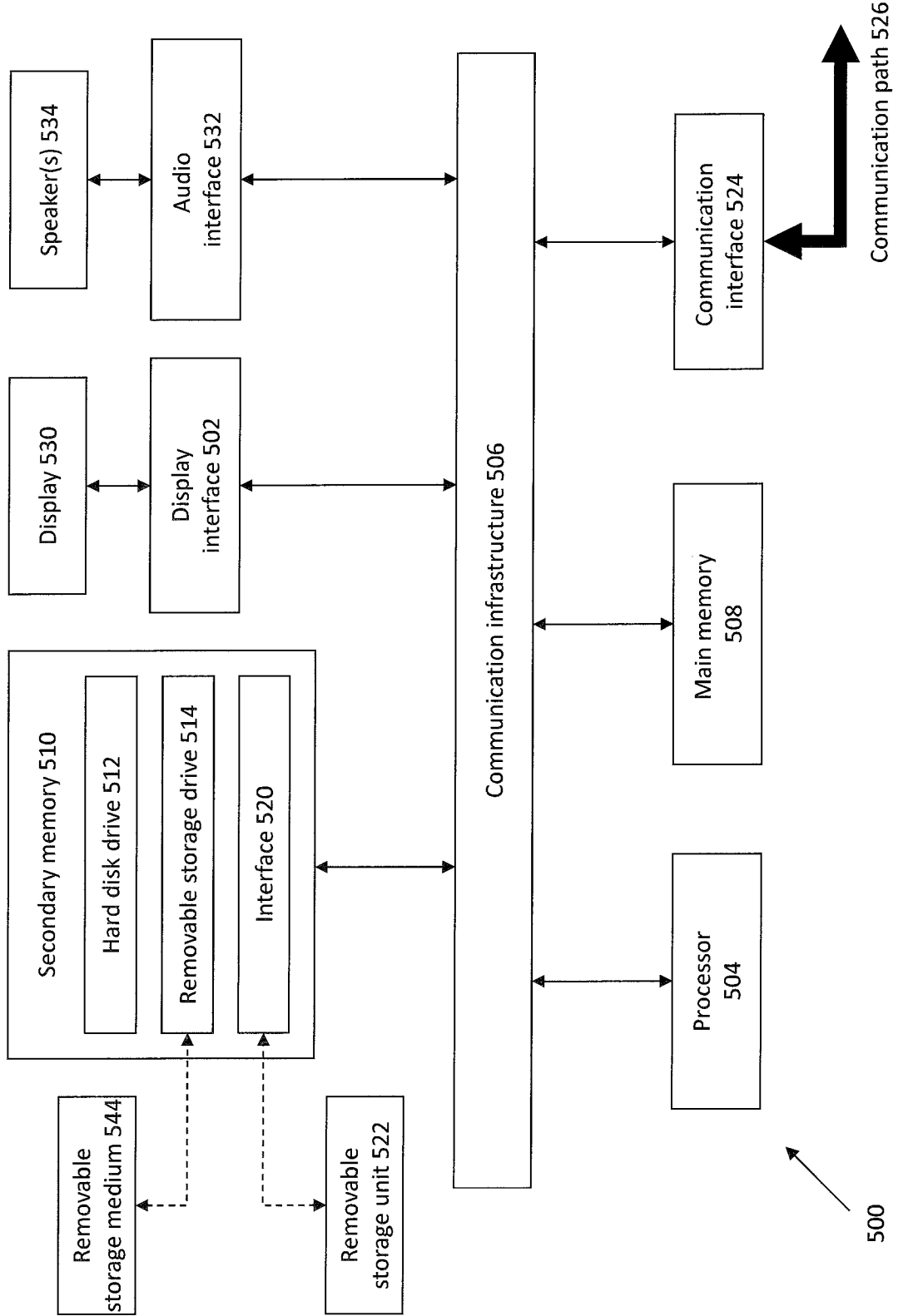

FIG. 5 shows an exemplary computing device 500 to realize a format translator for translating a message between a system agnostic format and one of a plurality of predetermined system formats, in accordance with the embodiments shown in FIGS. 1 to 3.

DETAILED DESCRIPTION

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1 shows a system 100, in accordance with an embodiment of the present application, that enables participants (merchants or banks) of a transaction to communicate messages in a system agnostic format with a payment gateway 106. By virtue of the system agnostic message communication, data of both single-message system transactions and dual-message system transactions can be captured and processed in the system 100 without hurdles for configuring and operating the participants' terminals or servers to communicate in both dual-message and single-message system messaging formats. The architecture and operation mechanism of the system 100 are described as follows.

As shown in FIG. 1, a transaction 100a takes place in an embodiment of a system 100. The transaction 100a can be a good or service purchase transaction 100a between a merchant (not shown) and a customer 101 at a brick and mortar store or an e-Commerce store. In the present embodiment, the customer 101 makes payment for the transaction 110a at a financial service terminal 102. The financial service terminal 102 can be a Point of Sales (POS) terminal 102 in the brick and mortar store or a virtual check-out (interchangeably referred to as an "virtual check-out server 102") at the e-Commerce store.

In this embodiment, as the transaction 100a takes place, the POS terminal 102 or the virtual check-out server 102 captures data (not shown) relating to transactional properties of the transaction 100a, and transmits 122 the data to a server 104 of the merchant's acquirer (interchangeably referred to as an "acquirer server 104") in the system 100.

Alternatively, the transaction 100a can be a currency conversion or other monetary transaction 100a that takes place at a financial service terminal 102 or a server 102 of an online service application of a bank. As an example, the financial service terminal 102 can be an ATM machine 102. Furthermore, the other monetary transaction 100a can be such as a cash withdrawal transaction. In this embodiment, as the transaction 100a takes place, the financial service terminal 102 captures data (not shown) relating to transactional properties of the transaction 100a and transmits 122 the data to a server 104 of the bank that runs the ATM machine 102 or the server 102. For the simplicity of the present application, the bank is also referred to as an acquirer, and the server 104 of the bank is also referred to as the acquirer server 104.

For the simplicity of the present application, further embodiments of the transactions 100a will not be described. It can be appreciated by a skilled person in the art that the present system 100 allows similar transactions to be conducted and processed.

In the system 100, the transactional properties of the transaction 100a comprise at least a channel 112 of the transaction 100a. The channel 112 indicates an essential nature that determines a type of the transaction 100a. For example, if the channel 112 indicates that the transaction 100a is conducted at an ATM machine, the transaction 100a can be determined as a single-message system transaction 100a. As mentioned above, the channel 112 of the transaction 100a may also be a POS machine, a core banking service terminal used at a bank counter, a virtual check-out server and/or the like. If, in an alternative example, the channel 112 indicates that the transaction 100a is conducted at a POS machine of a brick and mortar store or a virtual check-out server of an e-Commerce store, the transaction 100a can be determined as a dual-message system transaction 100a.

The transactional properties of the transaction 100a can further comprise data is a time of the transaction 100a, a date of the transaction 100a, a location of the transaction 100a, a transaction reference number recorded at the financial service terminal 102 where a payment of the transaction 100a is conducted, a transaction amount of the transaction 100a, a reconciliation amount of the transaction 100a, a settlement amount of the transaction 100a, a card number of a payment card used by the customer 101 for the payment of the transaction 100a, an International Card Association (ICA) identifier of the acquirer that manages and/or administers the channel 112 of the transaction 100a, and a type of the merchant (such as a merchant identifier registered at a payment gateway 106 in the system 100) where the transaction 100a takes place. The transactional properties of the transaction 100a can further comprise information of a card acceptor (interchangeably referred to as "card acceptor information"), which in many scenarios is the acquirer that accepts the payment card for the payment of the transaction 100a. The card acceptor information comprises a country code, a postal code, an address, and/or a name of the acquirer. The transactional properties of the transaction 100a can further comprise a transaction service fee chargeable by the payment gateway 106 to the acquirer for processing the transaction 100a.

In an embodiment of the present application, the acquirer server 104 can be an API server or a message generation server managed by the acquirer or by a third party service provider on behalf of the acquirer.

In the present embodiment, the acquirer server 104 comprises a module 104a that is configured to generate 105 a message 114 based on the data relating to the transactional properties of the transaction 100a received 122 in the acquirer server 104. The message 114 is in a system agnostic format and comprises transactional properties of the transaction 100a. The transactional properties of the transaction 100a comprised in the system agnostic format message 114 comprises at least the information of the channel 112 of the transaction 100a.

In the embodiments of the present application, in addition to the channel 112 of the transaction 100a, the module 104a is further configured to include one or more of the transactional properties of the transaction 100a as described above into the message 114 in the system agnostic format.

For example, the message 114 in the system agnostic format can be constructed by the module 104a as follows:

<?xml version="1.0" encoding="UTF-8"?>
<UniversalmessagetransactionRequest>
<TransactionReference>1234567890</TransactionReference>
<CardNumber>5184680430000006</CardNumber>
<TransactionAmount>
<Value>1314</Value>
<Currency>566</Currency>
</TransactionAmount>
<ReconciliationAmount>
<Value>4.32</Value>
<Currency>840</Currency>
</ReconciliationAmount>
<SettlementAmount>
<Value>4.32</Value>
<Currency>840</Currency>
<SettlementAmount>
<LocalDate>0822</LocalDate>
<LocalTime>133414</LocalTime>
<Channel>ATM</Channel>
<ICA>009674</ICA>
<MerchantType>6532</MerchantType>
<CardAcceptor>
<Name>THE BEST BANK</Name>
<City>ANYTOWN<City>
<State>MO</State>
<PostalCode>63101-1234</PostalCode>
<Country>USA</Country>
<CardAcceptor>
<TransactionFee>
<Value>25588</Value>
<Currency>840</Currency>

<TransactionFee>
</UniversalMessagetransactionRequest>

In other examples, further transactional properties of the transaction 100a can be added into the message 114 to determine the nature of the transaction 100a in accordance with practical requirements.

As shown in FIG. 1, the system 100 further comprises a format translator 110. The format translator 110 can be a stand-alone device 110 that links the acquirer server 104 to the payment gateway 106 that facilitates authorization, clearing and settlement of the transaction. In another embodiment, the format translator 110 can be implemented as a middleware system operated in an interface processor 110 that connects the acquirer server 104 to the payment gateway 106. The skilled person in the art will readily understand that the interface processor 110 serves as an entry point for switching and routing transaction processing networks within the payment gateway 106.

As shown in FIG. 1, the format translator 110 comprises an input module 120, a translation module 130 and an output module 140. The input module 120 is configured to receive 124 the message 114 in the system agnostic format from the acquirer server 104. The received message 114 in the system agnostic format will then be transmitted to the translation module 130 for translation into a message in the single-message system format or the dual-message system format.

As described above, the type of the transaction 100a can be determined by the channel 112 of the transaction 100a. In this manner, the translation module 130 is configured to translate the message 114 into a message 114a/114b in one of two pre-determined system formats (that is, to translate the message 114 into a message 114a/114b in the single-message system format or in the dual-message system format) in response to the channel 112 of the transaction 100a comprised in the received message 114. For example, the channel 112 of the transaction 100a can be an ATM channel if the payment of the transaction 110a is made at an ATM machine 102, or a POS channel if the payment of the transaction 110a is made at a POS terminal 102, or an e-Commerce channel if the payment of the transaction 110a is made at a virtual check-out server 102.

In an embodiment, the translation module 130 is configured to translate the message 114 into a first predetermined system format (e.g. the single-message system format) in response to the channel 112 of the transaction 100a being a first channel 112 of transaction 100a (e.g. the ATM channel). In this embodiment, the translated message 114a in the first predetermined system format (e.g. the single-message system format) comprises all data required for authorization, clearing and settlement of the transaction 100a.

In another embodiment, the translation module 130 is configured to translate the message 114 into a second predetermined system format (e.g. the dual-message system format) in response to the channel 112 of the transaction 100a being a second channel 112 of transaction 100a (e.g. the POS channel or the e-Commerce channel). In this embodiment, the translated message 114b in the second predetermined system format (e.g. the dual-message system format) comprises a first message comprising data for the authorization of the transaction and a second message comprising data for the clearing and settlement of the transaction. In the above embodiments, the translated message 114a/114b is then transmitted to the output module 140 to communicate 126 with the payment gateway 106. The translated message 114a/114b is then routed through the payment gateway 106 into a second party 108 for further authorization, clearing and settlement of the transaction 100a. The second party 108 can be an issuer 108 of the payment card used for the payment of the transaction 100a.

For the simplicity of the present application, the routing of the translated message 114a/114b in the payment gateway 106 and the further authorization, clearing and settlement of the transaction 100a are not described.

In the system 100, it can be appreciated by the skilled person that, after the the routing of the translated message 114a/114b and the further authorization, clearing or settlement of the transaction 100a are processed at the payment gateway 106 or the issuer 108, the format translator 110 can translate messages in the single-message system format 114a or the dual-message system format 114b from the payment gateway 106 into messages in the system agnostic format 114 in a similar manner as described above. The translated messages in the system agnostic format 114 can be communicated from the format translator 110 to the acquirer server for necessary processing. The steps in this embodiment are not shown in the FIG. 1 for the sake of simplicity.

Similar to FIG. 1, FIG. 2 shows another embodiment of the present application. Like reference numerals and characters in the drawings refer to like elements, equivalents or steps. FIG. 2 shows a system 200 wherein the format translator 110 as shown in FIG. 1 is implemented as a format translator 110 in the payment gateway 206.

In the embodiment shown in FIG. 2, the format translator 210 can be in the form of either a part of a firmware, a software patch, or a part of hardware for a processor 206 of the payment gateway 206.

Similar to FIGS. 1 and 2, FIG. 3 shows a further embodiment of the present application. Like reference numerals and characters in the drawings refer to like elements, equivalents or steps. FIG. 3 illustrates a system 300 wherein the format translator 110, 210 as shown in FIGS. 1 and 2 is implemented in the acquirer server 104, 204, 304 that participates in the authorization, clearing and settlement of the transaction 100a, 200a, 300a.

In the embodiment shown in FIG. 3, the format translator 310 can be in the form of either a part of a firmware, a software patch, or a part of hardware for the acquirer server 104, 204, 304.

In view of the system 100, 200, 300 for translating a message between a system agnostic format and one of a plurality of predetermined system formats as illustrated in FIGS. 1 to 3, and as described above, FIG. 4 shows a flow chart 400 that exemplifies steps of a method of translating a message between a system agnostic format and one of a plurality of predetermined system formats at the format translator 110, 210, 310.

At step 402, the format translator 110, 210, 310 receives 124, 224, 324 a message 114, 214, 314, from a first party 104, 204, 304a, in a system agnostic format that comprises transactional properties of a transaction 100a, 200a, 300a conducted at a financial service terminal 102, 202, 302. The transactional properties of the transaction 100a, 200a, 300a at least comprise a channel 112, 212, 312 of the transaction 100a, 200a, 300a. As described above, the channel 112, 212, 312 of the transaction 100a, 200a, 300a can be, for example, an ATM machine, a POS machine, a core banking service terminal used at a bank counter, a virtual check-out server and/or the like.

In an embodiment, the first party 104, 204, 304a can be an acquirer 104, 204, 304. In the embodiment, the method shown in the flow chart 400 can be implemented by a stand-alone device 110 as shown in FIG. 1. The stand-alone device 110 can be an interface processor 110, in which a middleware system configured as the format translator 110, 210, 310 is installed, that links the acquirer 104, 204, 304 to a payment gateway 106, 206, 306 that facilitates authorization, clearing and settlement of the transaction 100a, 200a, 300a.

In another embodiment, the method shown in the flow chart 400 can be implemented by a middleware system 210 in the form of either a part of firmware, a software patch, or a part of hardware for a processor of the payment gateway 206, as shown in FIG. 2.

In a further embodiment, the method shown in the flow chart 400 can be implemented by a middleware system 310 in the form of either a part of firmware, a software patch, or a part of hardware for a server of the acquirer bank 304 that participates in the authorization, clearing and settlement of the transaction 100a, 200a, 300a.

In the embodiments, the message 114, 214, 314 in the system agnostic format is generated 105, 205, 305 at a module 104a, 204a, 304a in the acquirer server 104, 204, 304. In an embodiment, the acquirer server 104, 204, 304 can be an API server or a message generation server of the acquirer.

At step 404, the format translator 110, 210, 310 translates 135, 235, 335 the message 114, 214, 314 into one of a plurality of predetermined system formats, for example the single-message system format 114a, 214a, 314a or the dual-message system format 114b, 214b, 314b in response to the channel 112, 212, 312 of the transaction 100a, 200a, 300a.

In an embodiment of the step 404, when the channel 112, 212, 312 of the transaction 100a, 200a, 300a is a first type of channel of transaction, i.e. when the transaction 100a, 200a, 300a is taken place at automated teller machines (ATMs) 102, 202, 302, the format translator 110, 210, 310 translates the message 114, 214, 314 into a first predetermined system format, i.e. the single-message system format 114a, 214a, 314a, in response to the channel of the transaction being the first channel of transaction. In this embodiment, the translated single-message system format message 114a, 214a, 314a comprises all data required for authorization, clearing and settlement of the transaction 100a, 200a, 300a.

In another embodiment of the step 404, when the channel 112, 212, 312 of the transaction 100a, 200a, 300a is a second type of channel of transaction, i.e. when the payment of the transaction 100a, 200a, 300a is made on credit cards or debit cards at the financial service terminal 102, 202, 302, the format translator 110, 210, 310 translates the message 114, 214, 314 into a second predetermined system format, i.e. the dual-message system format 114b, 214b, 314b, in response to the channel of the transaction being the second channel of transaction. The financial service terminal 102, 202, 302 can be in the form of point of sale (POS) machines or e-Commerce virtual check-outs. In this embodiment, the translated dual-message system format message 114b, 214b, 314b can comprise a first message comprising data for the authorization of the transaction, and a second message comprising data for the clearing and settlement of the transaction.

In the above described embodiments, the translated single- or dual-message format messages 114b, 214b, 314b are routed through the payment gateway 106, 206, 306 into a second party 108, 208, 308 for further authorization, clearing and settlement of the transaction 100a, 200a, 300a. The second party 108, 208, 308 can be issuer banks as described above. For the simplicity of the present disclosure, the routing and forwarding of the translated single- or dual-message format messages 114b, 214b, 314b between the payment gateway 106, 206, 306 and the second party 108, 208, 308 will not be described.

In the above described embodiments, the transactional properties of the transaction 100a, 200a, 300a comprised in the message 114, 214, 314 further comprise information about the transaction 100a, 200a, 300a, such as one or more of a time of the transaction 100a, 200a, 300a, a date of the transaction 100a, 200a, 300a, a location of the transaction 100a, 200a, 300a, a transaction reference number recorded at the financial service terminal 102, 202, 303 where the payment of the transaction 100a, 200a, 300a is conducted, a transaction amount of the transaction 100a, 200a, 300a, a reconciliation amount of the transaction 100a, 200a, 300a, a settlement amount of the transaction 100a, 200a, 300a, a card number of a payment card used by the customer 101, 201, 301 for the payment of the transaction 100a, 200a, 300a, an International Card Association (ICA) identifier of acquirer bank 104, 204, 304 that owns the channel 112, 212, 312 of the transaction 100a, 200a, 300a, a type of the merchant (such as a merchant identifier registered at the payment gateway 106, 206, 306) where the transaction 100a, 200a, 300a is taken place, card acceptor information (such as a country code, postal code, address, and/or name of the merchant's acquirer bank 104, 204, 304), and a transaction fee chargeable by the payment gateway 106, 206, 306 to the acquirer bank 104, 204, 304. As described herein, the payment gateway 106, 206, 306 can be a payment gateway run by MasterCard, Visa, American Express, etc.

As appreciated by the skilled person in the art, the format translator 110, 210, 310 is further able to translate a message 114b, 214b, 314b in either the single- or dual-message formats into a message 114, 214, 314 in the system agnostic format. In an embodiment, the format translator 110, 210, 310 can further receives (not shown) a message 114b, 214b, 314b in either the single- or dual-message formats from the payment gateway 106, 206, 306. The message 114b, 214b, 314b in either the single- or dual-message formats can comprise data relating to a response from the payment gateway 106, 206, 306 to an authorization request (e.g. comprised in the message 114, 214, 314, not shown) of the transaction 100a, 200a, 300a. The format translator 110, 210, 310 can further translate the message 114b, 214b, 314b in either the single- or dual-message formats into a message 114, 214, 314 in the system agnostic format.

FIG. 5 depicts an exemplary computing device 500, hereinafter interchangeably referred to as a computer system 500, where one or more such computing devices 500 may be used in the above-described system 100, 200, 300 to implement the above-described method 400 for translating a message between a system agnostic format and one of a plurality of predetermined system formats, such as the single-message format or the dual-message format. The exemplary computing device 500 can be used to implement the format translator 110, 210, 310; the financial service terminal 102, 202, 302; the server 104, 204, 304 of the acquirer bank; the payment gateway 106, 206, 306; or the server 108, 208, 308 of the issuer bank as described herein. The following description of the computing device 500 is provided by way of example only and is not intended to be limiting.

As shown in FIG. 5, the example computing device 500 includes a processor 504 for executing software routines. Although a single processor is shown for the sake of clarity, the computing device 400 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 514, which may include a magnetic tape drive, an optical disk drive, a solid state storage drive (such as a USB flash drive, a flash memory device, a solid state drive or a memory card), or the like. The removable storage drive 514 reads from and/or writes to a removable storage medium 544 in a well-known manner. The removable storage medium 544 may include magnetic tape, optical disk, non-volatile memory storage medium, or the like, which is read by and written to by removable storage drive 514. As will be appreciated by persons skilled in the relevant art(s), the removable storage medium 544 includes a non-transitory or transitory computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 530. Examples of a removable storage unit 522 and interface 530 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 530 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments of the inventions, the communication interface 524 permits data to be transferred between the computing device 500 and a data communication network, such as a public data or private data communication network. The communication interface 524 may be used to exchange data between different computing devices 500 which such computing devices 500 form part of an interconnected computer network. Examples of a communication interface 524 can include a modem, a network interface (such as an Ethernet card), a communication port (such as a serial, parallel, printer, GPIB, IEEE 1394, RJ45, USB), an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

As shown in FIG. 5, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage medium 544, removable storage unit 522, a hard disk installed in storage drive 512, or a carrier wave carrying software over communication path 526 (wireless link or cable) to communication interface 524. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the storage drive 512, or the interface 550. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example to explain the operation and structure of the format translator 110, 210, 310; the financial service terminal 102, 202, 302; the server 104, 204, 304 of the acquirer bank; the payment gateway 106, 206, 306; or the server 108, 208, 308 of the issuer bank as described herein. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

In one embodiment, the computing device 500 is implemented as the format translator 110, 210, 310 for translating a message between a system agnostic format and one of a plurality of predetermined system formats. The computing device 500 comprises an input module 120, 220, 320, a translation module 130, 230, 330, and an output module 140, 240, 340. The input module 120, 220, 320 of the computing device 500 is configured to receive the message, from a first party, in a system agnostic format that comprises transactional properties of a transaction conduced at a financial service terminal. The transactional properties of the transaction at least comprise a channel of the transaction. The translation module 130, 230, 330 of the computing device 500 is configured to translate the message into one of a plurality of predetermined system formats in response to the channel of the transaction. The output module 140, 240, 340 is configured to communicate the translated message.

In the present embodiment, the computing device 500 is configured to translate the message of the system agnostic format into a first predetermined system format in response to the channel of the transaction being a first channel of transaction. The first predetermined system format comprises all data required for authorization, clearing and settlement of the transaction. In an embodiment, the first channel of transaction comprises an automated teller machine (ATM). The first predetermined system format is the single-message system format as described above.

In the present embodiment, the computing device 500 is further configured to translate the message of the system agnostic format into a second predetermined system format in response to the channel of the transaction being a second channel of transaction. The translated message in the second predetermined system for comprises a first message comprising data for the authorization of the transaction, and a second message comprising data for the clearing and settlement of the transaction. In an embodiment, the second channel of transaction comprises a point of sale (POS) machine or an e-Commerce virtual check-out where the transaction is made on credit cards or debit cards. The second predetermined system format is the dual-message system format as described above.

In the present embodiment, the first party can be an acquirer. The computing device 500 serves in a middleware that links the acquirer to a payment gateway that facilitates authorization, clearing and settlement of the transaction.

In the present embodiment, the input module 120, 220, 320 of the computing device 500 is further configured to receive a message in one of the plurality of predetermined system formats from a payment gateway. In this embodiment, the message at least comprises data relating to a response from the payment gateway regarding an authorization request made by the first party. The translation module is further configured to translate the message in the one of the plurality of predetermined system formats into a message in the system agnostic format.

As described above, the embodiments of the present application enable participants (merchants or banks) of a transaction to communicate messages in a system agnostic format with a payment gateway. By virtue of the system agnostic message communication, data of both single-message system transactions and dual-message system transactions can be captured and processed in a payment network system 100, 200, 300 as described in the present application without hurdles as described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects illustrative and not restrictive.

The invention claimed is:

1. A method for enabling system-agnostic transactions, the method comprising:
   receiving a message, from a first party, in a system agnostic format that comprises transactional properties of a transaction conducted at a financial service terminal, the transactional properties of the transaction at least comprising a channel of the transaction and a card number, wherein the channel of the transaction comprises one of a plurality of channels, wherein the plurality of channels comprises an ATM channel, a point of sale (POS) channel, and an e-Commerce channel;
   determining the channel of the transaction from the message in the system agnostic format, the channel of the transaction indicating one of a plurality of predetermined system formats, wherein the plurality of predetermined system formats comprises a single message type and a dual message type; and
   translating the message from the system agnostic format into one of the single message type or the dual message type based on the determined channel of transaction, the translated message comprising the card number.

2. The method of claim 1, wherein the transactional properties of the transaction further comprise one or more of:
   a time of the transaction, a date of the transaction, and a location of the transaction.

3. The method of claim 1, wherein the transactional properties of the transaction further comprise one or more of:
   a transaction reference number, a card number of a payment card used for payment of the transaction, a transaction amount, a reconciliation amount, a settlement amount, an International Card Association (ICA) identifier of the channel of the transaction, a merchant type, a card acceptor information, and a transaction fee.

4. The method of claim 1, wherein the first party is an acquirer, and where the method is implemented by a middleware system in an interface processor that links the acquirer to a payment gateway that facilitates authorization, clearing and settlement of the transaction.

5. The method of claim 4, wherein determining the channel of the transaction from the message in the system agnostic format comprises determining that the channel of the transaction is of the single message type,
   wherein translating the message from the system agnostic format into one of the single message type or the dual message type based on the determined channel of transaction comprises translating the message from the system agnostic format into the system format of the single message type comprising all data, including the card number, required for authorization, clearing and settlement of the transaction.

6. The method of claim 4, wherein determining the channel of the transaction from the message in the system agnostic format comprises determining that the channel of the transaction is of the dual message type,
   wherein translating the message from the system agnostic format into one of the single message type or the dual message type based on the determined channel of transaction comprises translating the message from the system agnostic format into the system format of the dual message type comprising a first message comprising data, including the card number, for the authorization of the transaction, and a second message comprising data for clearing and settlement of the transaction.

7. The method of claim 5, wherein the translated message is routed through the payment gateway into a second party for further authorization, clearing and settlement of the transaction.

8. The method of claim 4, wherein the message in the system agnostic format is generated at an API server or a message generation server of the acquirer.

9. The method of claim 1, further comprising:
   receiving a message in one of the plurality of predetermined system formats from a payment gateway, the message at least comprising data relating to a response from the payment gateway to an authorization request of the transaction; and translating the message in the one of the plurality of predetermined system formats into a message in the system agnostic format.

10. A computing device implementing a format translator for enabling system-agnostic transactions, the computing device configured to:

receive a message, from a first party, in a system agnostic format that comprises transactional properties of a transaction conduced at a financial service terminal, the transactional properties of the transaction at least comprising a channel of the transaction and a card number, wherein the channel of the transaction comprises one of a plurality of channels, wherein the plurality of channels comprises an ATM channel, a point of sale (POS) channel, and an e-Commerce channel;

determine the channel of the transaction from the message in the system agnostic format, the channel of the transaction indicating one of a plurality of predetermined system formats, wherein the plurality of predetermined system formats comprises a single message type and a dual message type;

translate the message from the system agnostic format into one of the single message type or the dual message type based on the determined channel of transaction, the translated message comprising the card number; and communicate the translated message.

11. The computing device of claim 10, wherein the transactional properties of the transaction further comprise one or more of:

a time of the transaction, a date of the transaction, a location of the transaction, a transaction reference number, a transaction amount, a reconciliation amount, a settlement amount, an International Card Association (ICA) identifier of the channel of the transaction, a merchant type, a card acceptor information, and a transaction fee.

12. The computing device of claim 10, wherein when the determined channel of the transaction is of the single message type, the computing device is configured to translate the message into the system format of the single message type comprising all data, including the card number, required for authorization, clearing and settlement of the transaction.

13. The computing device of claim 10, wherein when the determined channel of the transaction is of the dual message type, the computing device is configured to translate the message into the system format of the dual message type comprising a first message comprising data, including the card number, for the authorization of the transaction, and a second message comprising data for the clearing and settlement of the transaction.

14. The computing device of claim 13, wherein the translated message is routed through a payment gateway into a second party for further authorization, clearing and settlement of the transaction.

15. The computing device of claim 10, wherein the first party is an acquirer, wherein the message in the system agnostic format is generated at an API server or a message generation server of the acquirer.

16. The computing device of claim 10, further configured to:

receive a message in one of the plurality of predetermined system formats from a payment gateway, the message at least comprising data relating to a response from the payment gateway regarding an authorization request made by the first party; and translate the message in the one of the plurality of predetermined system formats into a message in the system agnostic format.

17. A non-transitory computer readable medium having stored thereon executable instructions for performing a method for enabling system-agnostic transactions comprising:

receiving a message, from a first party, in a system agnostic format that comprises transactional properties of a transaction conducted at a financial service terminal, the transactional properties of the transaction at least comprising a channel of the transaction and a card number, wherein the channel of the transaction comprises one of a plurality of channels, wherein the plurality of channels comprises an ATM channel, a point of sale (POS) channel, and an e-Commerce channel;

determining the channel of the transaction from the message in the system agnostic format, the channel of the transaction indicating one of a plurality of predetermined system formats, wherein the plurality of predetermined system formats comprises a single message type and a dual message type; and translating the message from the system agnostic format into one of the single message type or the dual message type based on the determined channel of transaction, the translated message comprising the card number.

\* \* \* \* \*